United States Patent
Luck

(10) Patent No.: US 12,485,852 B1
(45) Date of Patent: Dec. 2, 2025

(54) AUTOMOBILE PEDAL ASSEMBLY

(71) Applicant: Finishing Lines LLC, Lees Summit, MO (US)

(72) Inventor: Joshua William Luck, Lees Summit, MO (US)

(73) Assignee: Finishing Lines, LLC, Blue Springs, MO (US)

(*) Notice: Subject to any disclaimer, the term of this patent is extended or adjusted under 35 U.S.C. 154(b) by 0 days.

(21) Appl. No.: 18/885,671

(22) Filed: Sep. 15, 2024

Related U.S. Application Data

(60) Provisional application No. 63/678,795, filed on Aug. 2, 2024.

(51) Int. Cl.
*B60T 7/04* (2006.01)
*B60T 13/00* (2006.01)
*G05G 1/30* (2008.04)
*G05G 1/44* (2008.04)

(52) U.S. Cl.
CPC .............. *B60T 7/04* (2013.01); *G05G 1/44* (2013.01); *B60T 13/00* (2013.01)

(58) Field of Classification Search
CPC .. B60T 7/04; B60T 13/00; G05G 1/44; B60K 26/02
See application file for complete search history.

(56) References Cited

U.S. PATENT DOCUMENTS

| | | | | |
|---|---|---|---|---|
| 3,257,522 | A * | 6/1966 | Raab | H01H 21/26 |
| | | | | 200/61.89 |
| 8,893,579 | B2 * | 11/2014 | Fujiwara | B60T 7/042 |
| | | | | 74/512 |
| 9,261,895 | B2 * | 2/2016 | Tsuguma | G05G 1/50 |
| 10,836,363 | B2 * | 11/2020 | Bartlett | B62D 65/14 |
| 2009/0229402 | A1 * | 9/2009 | Khan | B60T 7/06 |
| | | | | 74/512 |
| 2024/0338047 | A1 * | 10/2024 | Nakane | G05G 1/30 |

FOREIGN PATENT DOCUMENTS

KR 19980027067 U * 8/1998 ............. B60K 23/02

OTHER PUBLICATIONS

Finishing Lines EG Civic/DC Integra Billet Adjustable Brake Pedal; https://web.archive.org/web/20231129161044/https://finishing-lines.com/collections/pedals/products/eg-civic-dc-integra-billet-adjustable-brake-pedal#expand; Published Nov. 29, 2023 (Year: 2023).*

* cited by examiner

*Primary Examiner* — Adam D Rogers
(74) *Attorney, Agent, or Firm* — Sisson & Banyas, Attorneys at Law, LLC; Jeffrey J. Banyas

(57) ABSTRACT

An automobile brake pedal assembly includes an adjustable clevis assembly allowing a user to change the brake pedal ratio. The brake pedal mounting base accommodates the features of the automobile manufacturer's brake pedal bracket assembly allowing the disclosed subject matter to be used in place of the original brake pedal assembly included with the manufactured automobile.

26 Claims, 16 Drawing Sheets

AUTOMOBILE PEDAL ASSEMBLY

CROSS-REFERENCE TO RELATED APPLICATIONS

This application claims the benefit of priority to U.S. Non-Provisional Patent Application No. 63/678,795, filed Aug. 2, 2024, the contents of which are incorporated by reference herein in their entirety.

BACKGROUND

1. Field of the Disclosed Subject Matter

Automobile pedal assemblies.

2. BACKGROUND

Automobile braking systems are operated by a driver via a brake pedal assembly. The arrangement of the brake pedal components influences braking performance and the amount of foot pressure necessary for a user to actuate the braking system.

SUMMARY

An automobile brake pedal assembly includes an adjustable clevis assembly allowing a user to change the brake pedal ratio. The brake pedal mounting base accommodates the features of the automobile manufacturer's brake pedal bracket assembly allowing the disclosed subject matter to be used in place of the original brake pedal assembly included with the manufactured automobile.

BRIEF DESCRIPTION OF THE DRAWINGS

The present disclosed subject matter is described herein with reference to the following drawing figures, with greater emphasis being placed on clarity rather than scale.

DETAILED DESCRIPTION

Figure 1:
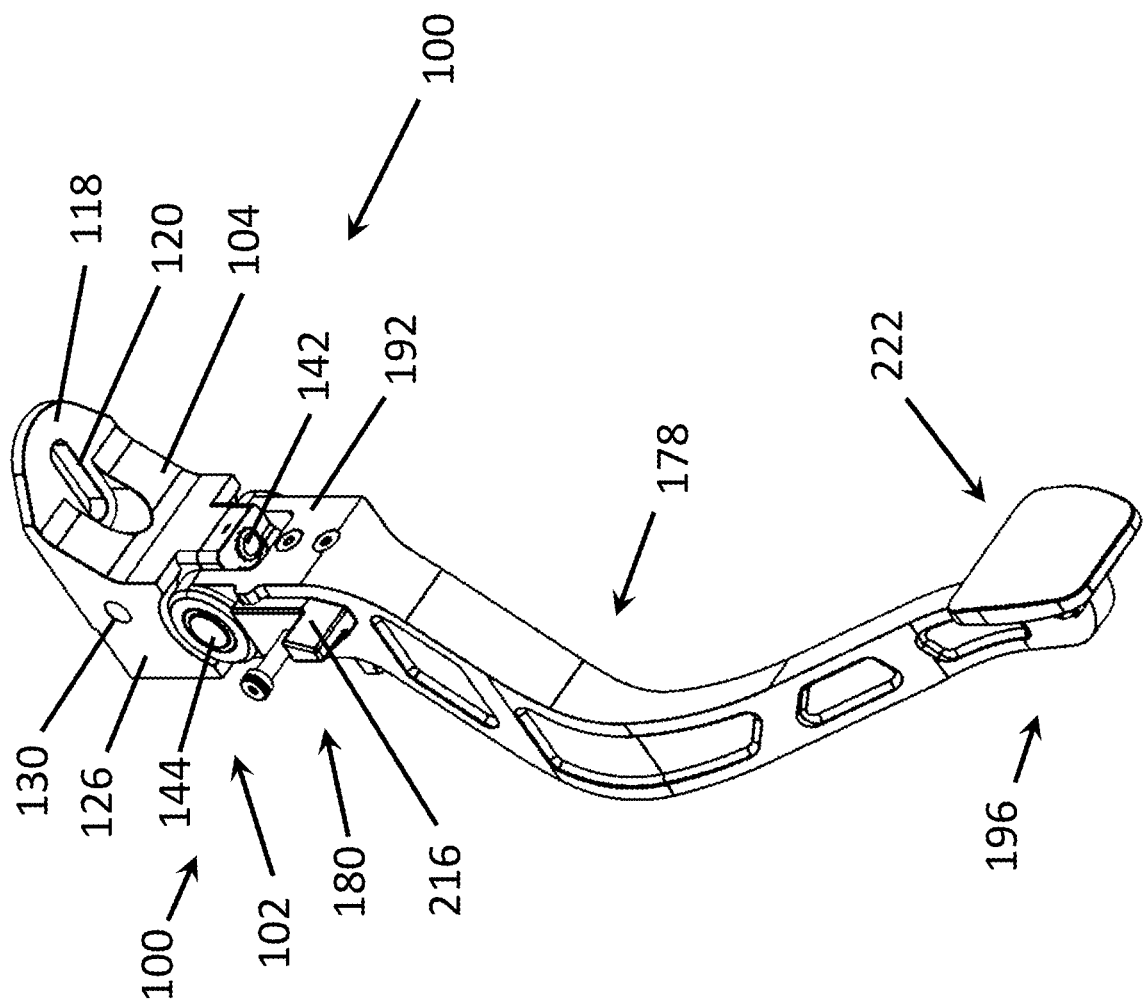
FIG. 1 is a perspective view from below of a pedal assembly according to aspects of the disclosed subject matter.
Figure 2:
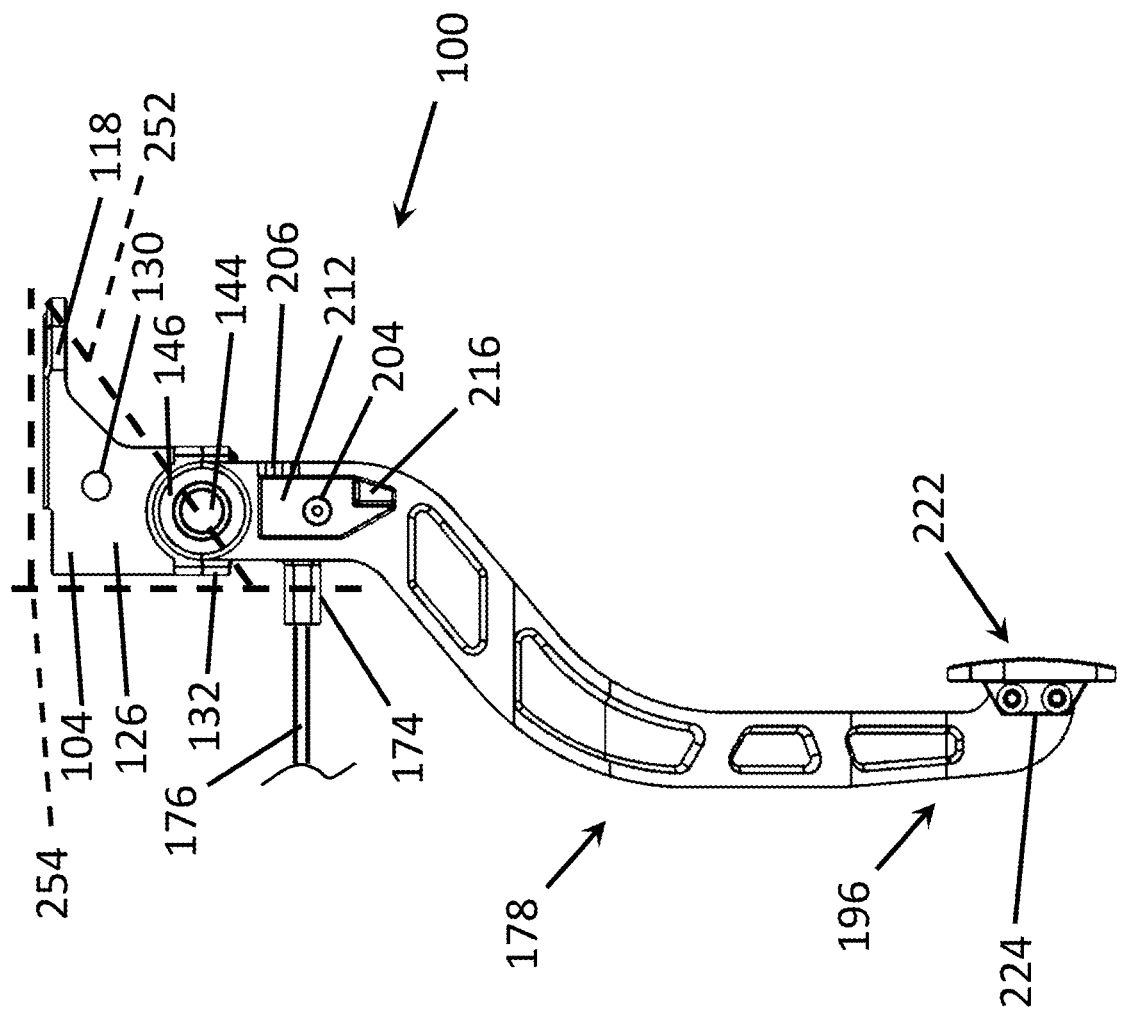
FIG. 2 is a left elevation view of the pedal assembly of FIG. 1.
Figure 3:
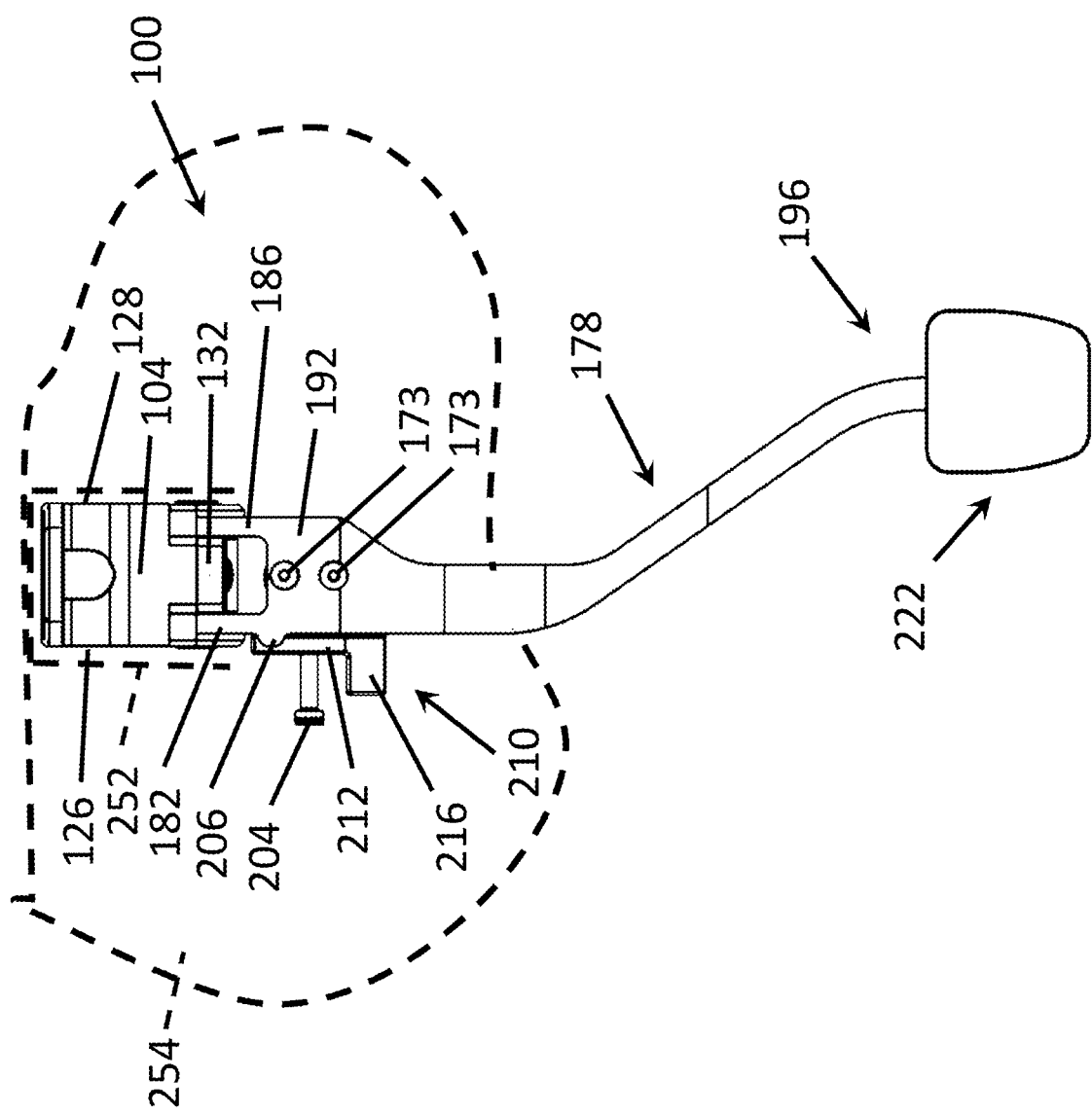
FIG. 3 is a front elevation view of the pedal assembly of FIG. 1.
Figure 4:
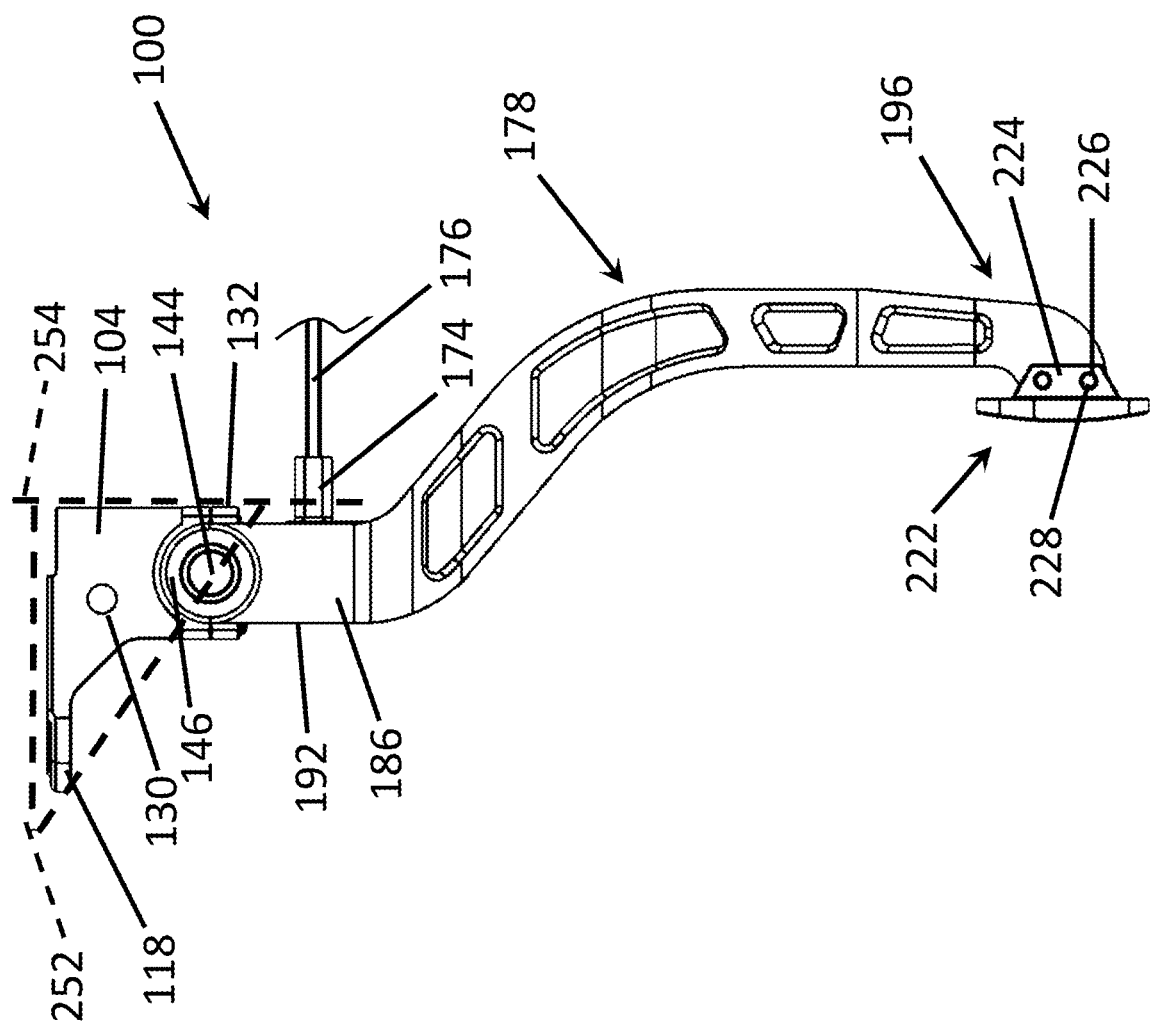
FIG. 4 is a right elevation view of the pedal assembly of FIG. 1.
Figure 5:
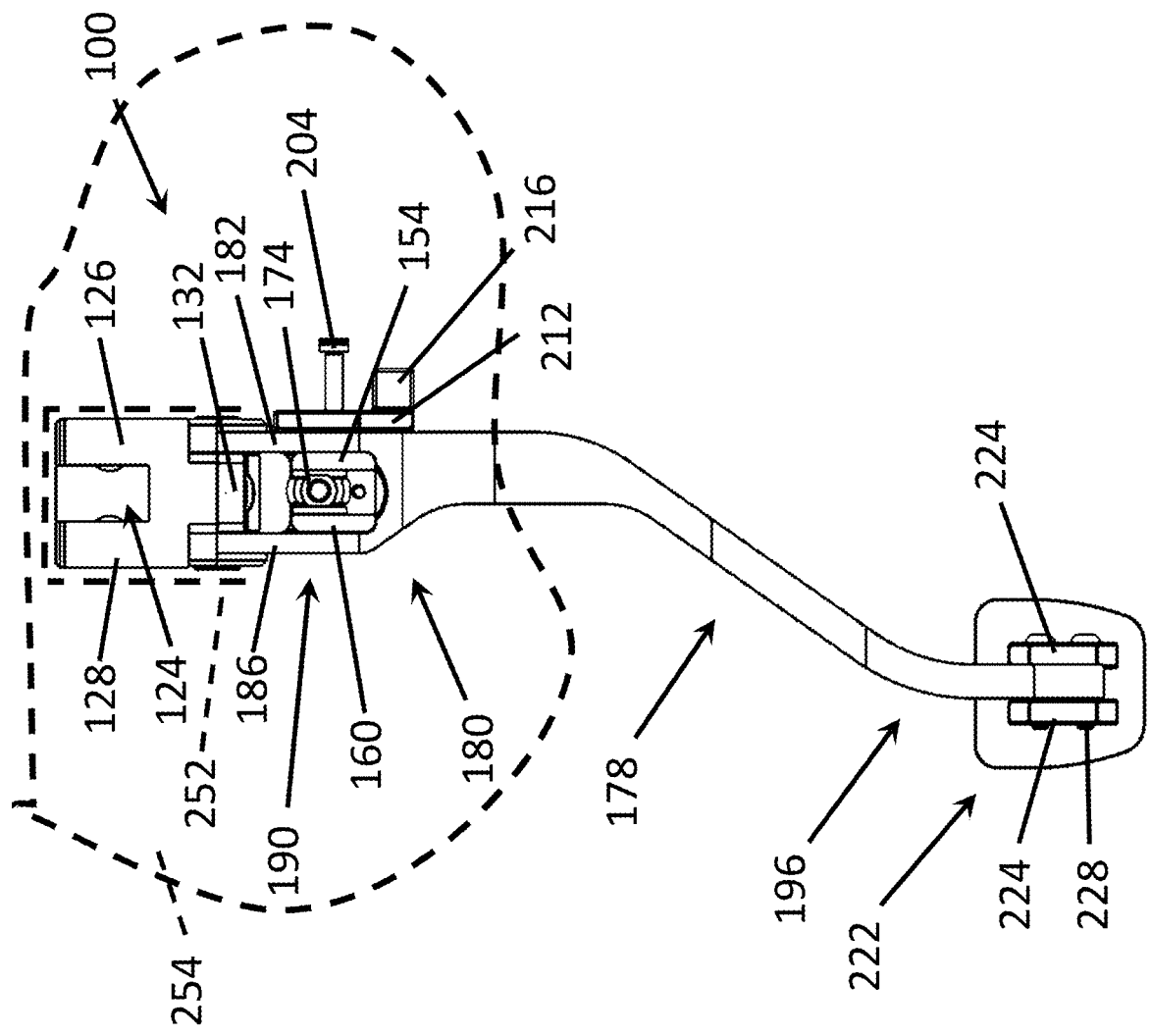
FIG. 5 is a rear elevation view of the pedal assembly of FIG. 1.
Figure 6:
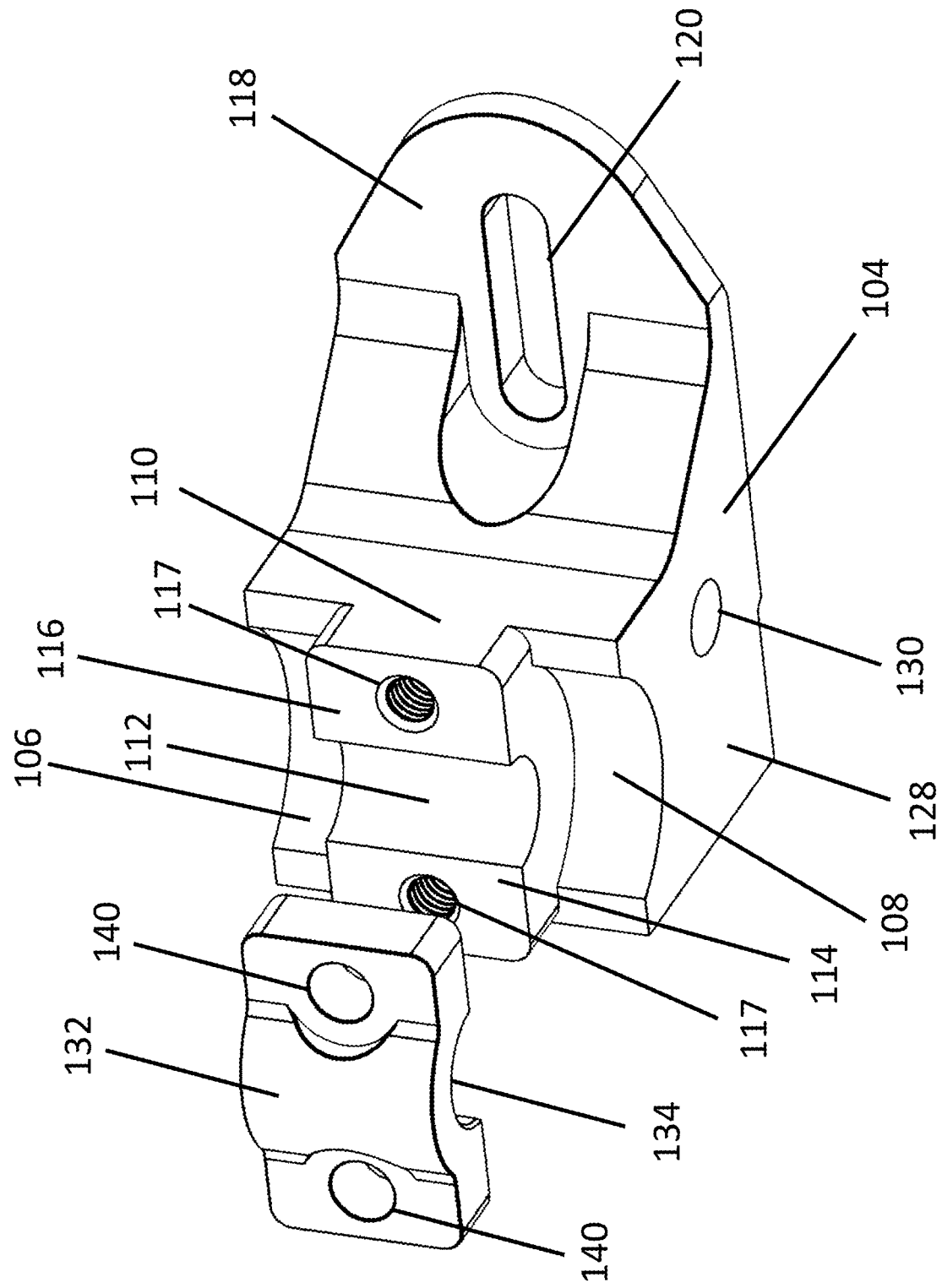
FIG. 6 is a perspective view from below of the mounting base.
Figure 7:
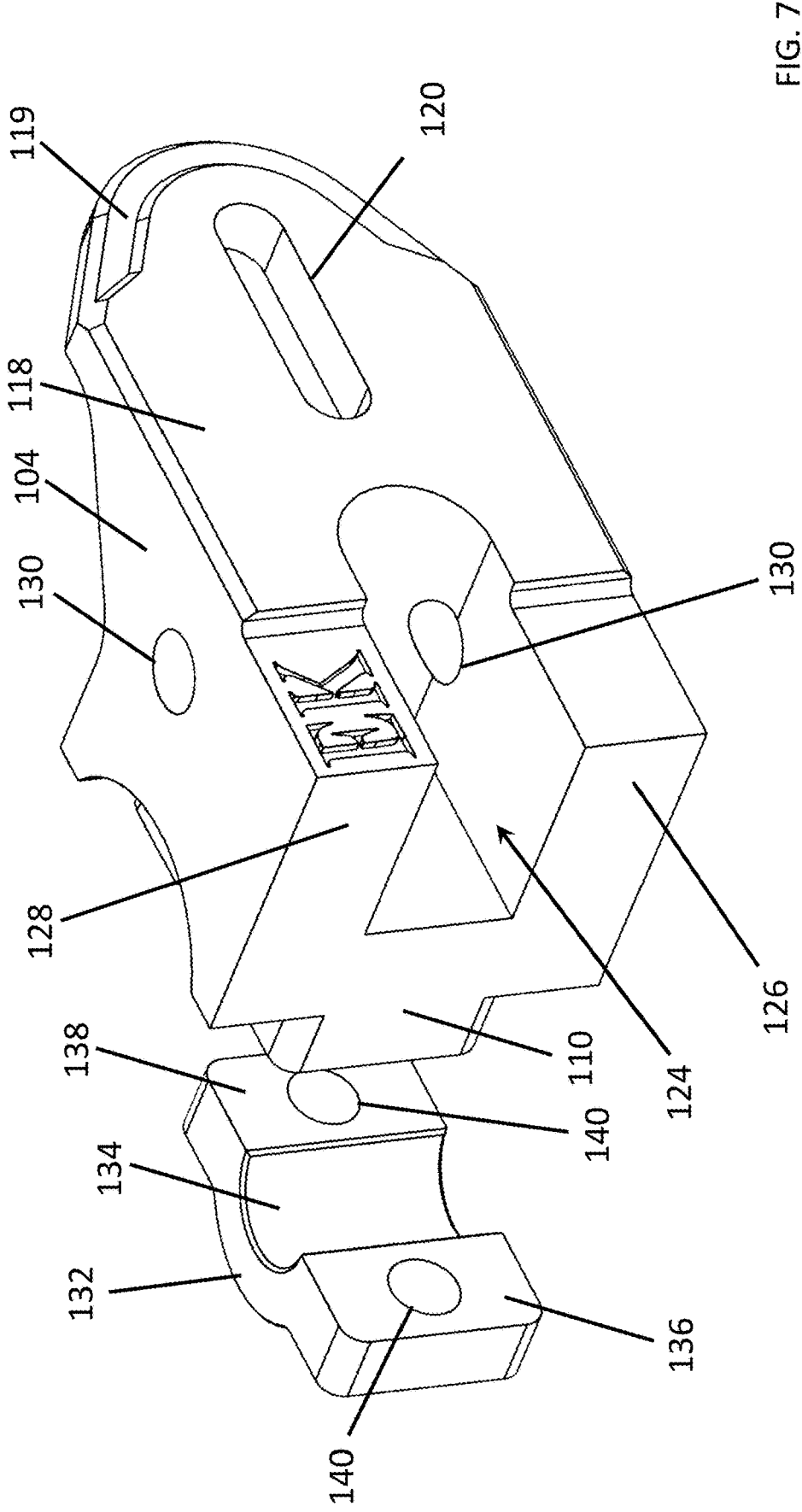
FIG. 7 is a perspective view from above of the mounting base of FIG. 6.
Figure 8:
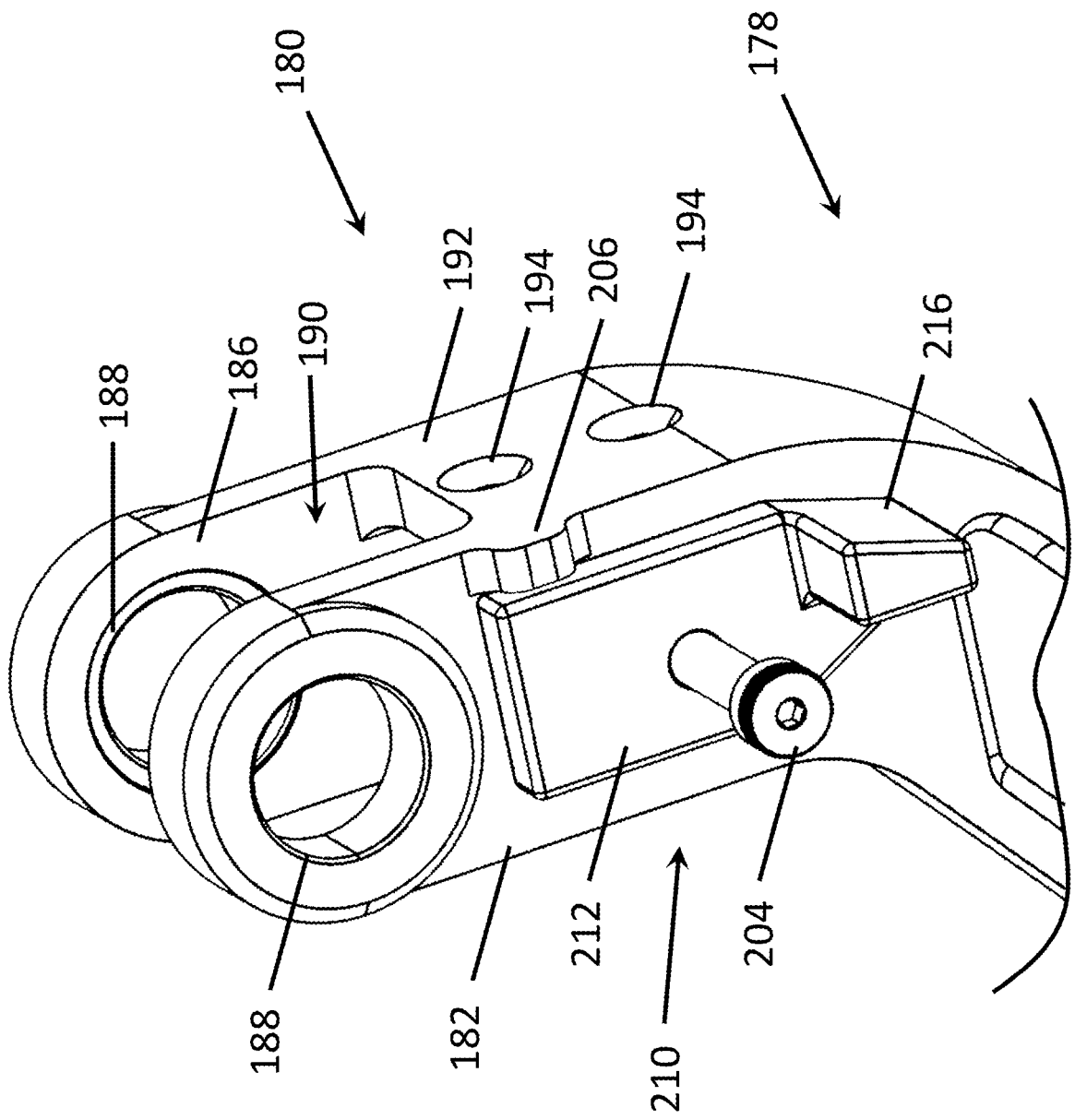
FIG. 8 is a left perspective view of the upper end of the pedal arm.
Figure 9:
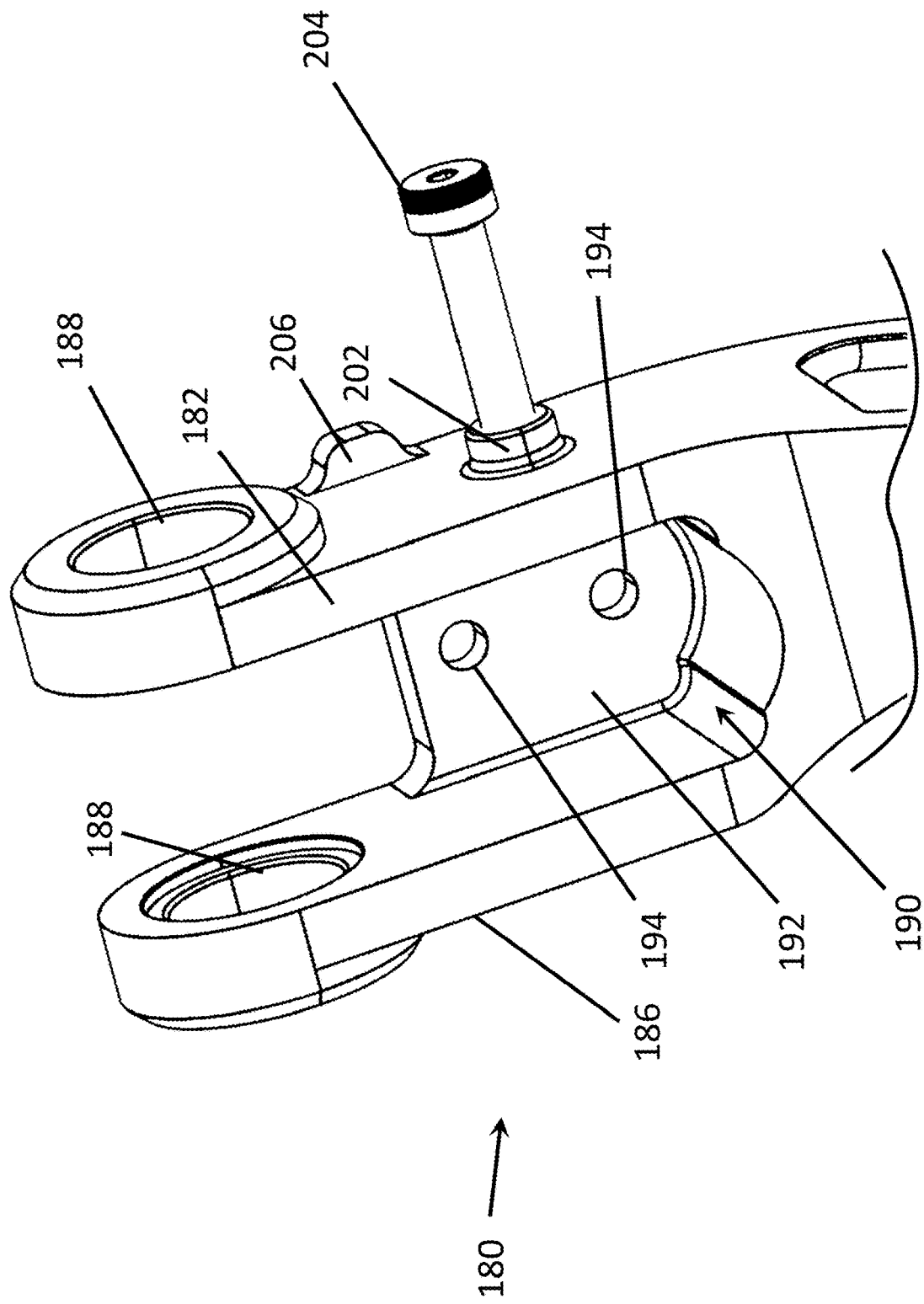
FIG. 9 is a rear perspective view of the upper end of the pedal arm of FIG. 8.
Figure 10:
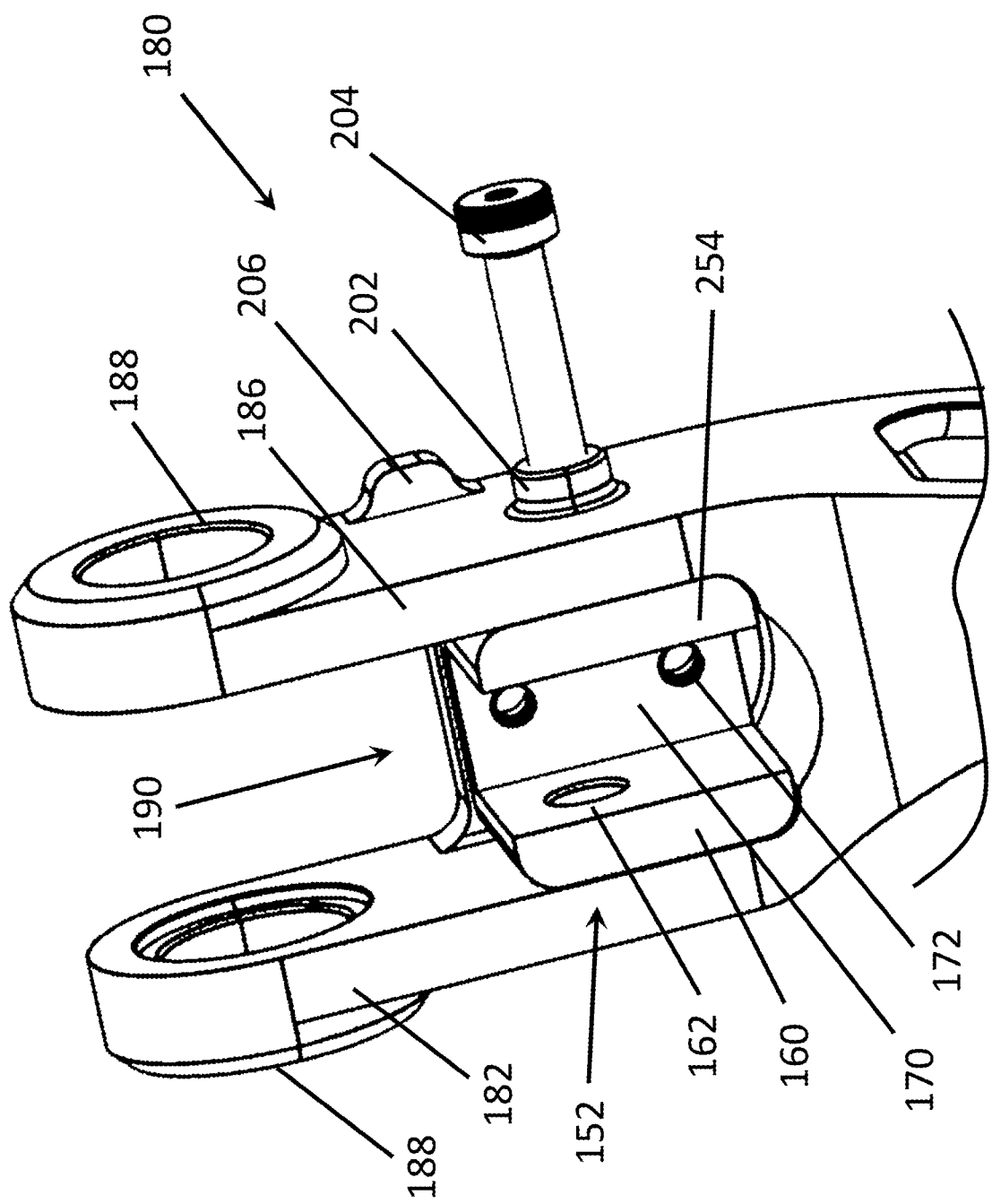
FIG. 10 is a rear perspective view of the upper end of the pedal arm of FIGS. 8-9 with a clevis assembly according to aspects of the disclosed subject matter.

An automobile pedal assembly with an adjustable ratio is shown and described. Referring to FIGS. 1-16, an implementation of the disclosed subject matter is directed to a brake pedal assembly 100 whereby the user can change the brake pedal ratio by using a clevis assembly 152 with varying placement of the attachment point for the push rod connected to the master cylinder of an automobile braking system. A brake pedal ratio is the distance between the center of a brake pedal pivot point, such as the brake pedal arm pivot shaft, and the middle of the foot plate attached to a brake pedal arm, divided by the distance between the center of the brake pedal pivot point and an attachment point of the brake master cylinder to the brake pedal arm. The brake pedal ratio affects the amount of foot pressure applied to the brake pedal foot plate to stop a moving automobile. Changing the distance from the pedal pivot point at the pivot shaft and the pedal connection to the pushrod connected to the brake master cylinder affects the brake pedal ratio. In addition, an aspect of the disclosed subject matter includes a mounting base 104 that mounts the pedal assembly 100 to an automobile manufacturer's pedal bracket assembly 252 mounted to a firewall 254 in the footwell of the automobile.

Referring to FIGS. 1-5, the pedal assembly 100 has an upper assembly 102 that provides for attachment to the automobile manufacturer's pedal bracket assembly, represented by 252, and connection to the automobile braking system. Further, the pedal assembly 100 has a pedal arm 178 that connects the user-actuated foot plate 222 to the upper assembly 102.

Referring to FIGS. 1-7, attachment to the automobile manufacturer's pedal bracket assembly 252 is provided by an upper assembly 102. The pedal bracket assembly 252 is beneath the front console within the footwell of the driver's side compartment of an automobile. The upper assembly 102 includes a mounting base 104. The mounting base 104 has a front portion that forms an upper cavity 124 formed from adjacent sidewalls 126, 128. A rear portion of the upper end of the mounting base 104 forms a foot 118 extending rearward from the cavity 124 forming an elongated aperture 120 for receiving a mounting bolt connected to the pedal bracket assembly 252. The foot 118 forms a lip 119 partially circumscribing the terminal end or rear edge of the foot 118. The first sidewall 126 and second sidewall 128 form the cavity 124 adapted for accommodating features of the manufacturer's pedal bracket assembly. An aperture 130 passes through each sidewall 126, 128 and aligns with holes in the sides (not shown) of the pedal bracket assembly 252 for securing the mounting base 104 thereto. In an implementation, the mounting base 104 uses the automobile manufacturer's brake pedal pivot point and hardware as an additional secured mounting point. The upper cavity 124 is open upward from the pedal arm 178 and forward from the foot 118.

The front portion of the lower end of the mounting base 104 forms an assembly for receiving a first end 180 of the pedal arm 178, and a pivot shaft 144, for forming a pivot connection therebetween. The mounting base 104 forms a first shoulder 106 and second shoulder 108 separated by a central support 110. The central support 110 forms a semicircular recess 112 for capturing a first portion of the pivot shaft 144. A cap forms a semicircular recess 134 for capturing a second portion of the pivot shaft 144. The cap 132 forms a first face 136 and a second face 138 on either side of the recess 134, each with an aperture 140 for receiving a threaded fastener 142 for securing the cap 132 to the central support 110 via threaded apertures 117 formed in a first face 114 and a second face 116 on either side of the semicircular recess 112. Securing the cap 132 to the mounting base 104 secures the pivot shaft 144 to the assembly. The first shoulder 106 accommodates a first side member 182 of the pedal arm 178 and the second shoulder 108 accommodates a second side member 186.

The first side member 182 and opposing second side member 186 rotate on the pivot shaft 144 via bushings 146. The bushings 146 are received within apertures 188 in the side members 182, 186. The first end 180 of the pedal arm 178 forms a forwardly open cavity 190 with a rear wall 192 disposed below the apertures 188 for accommodating a clevis assembly 152. The clevis assembly 152 is pivotally connected to a heim joint 174, and the heim joint 174 is connected to a pushrod 176 operably connected to a brake system master cylinder. The connection point between the heim joint 174 and clevis assembly 152 dictates the connection points between the pivot shaft 144 and the heim joint 174, directly impacting the brake pedal ratio. In an aspect of the disclosed subject matter, the clevis assembly 152 can be oriented one of two ways within the cavity 190, or replaced with an alternative clevis assembly, allowing a user to change the location of the attachment point of the heim joint 174 to the brake pedal arm 178 and thereby the distance between the center of the pivot shaft 144 and an attachment point of the brake master cylinder to the brake pedal arm 178, thus changing the pedal ratio.

The clevis assembly 152 includes a first arm 154 and second arm 160 extending from a front face 171 of a rear wall 170 to a front edge 167. The rear wall 170 forms threaded apertures 172 that align with apertures 194 in the rear wall 192 of the cavity 190, allowing the clevis assembly 152 to be secured to the pedal arm 178 by threaded members, such as screws 173. In an implementation, apertures 194 are threaded, and the clevis assembly 152 is secured to the pedal arm 178 by screws. The clevis assembly 152 forms a first edge 158 at an upper end and an opposite second edge 164 at a lower end formed by the upper and lower edges of the first and second arms 154, 160, with a horizontal midline 166 of the arms 154, 160 disposed equidistant between the first edge 158 and second edge 164. A vertical midline 168 is disposed equidistant between the front face 171 of the rear wall 170 and the front edge 167 of the arms 154, 160.

Figure 11:
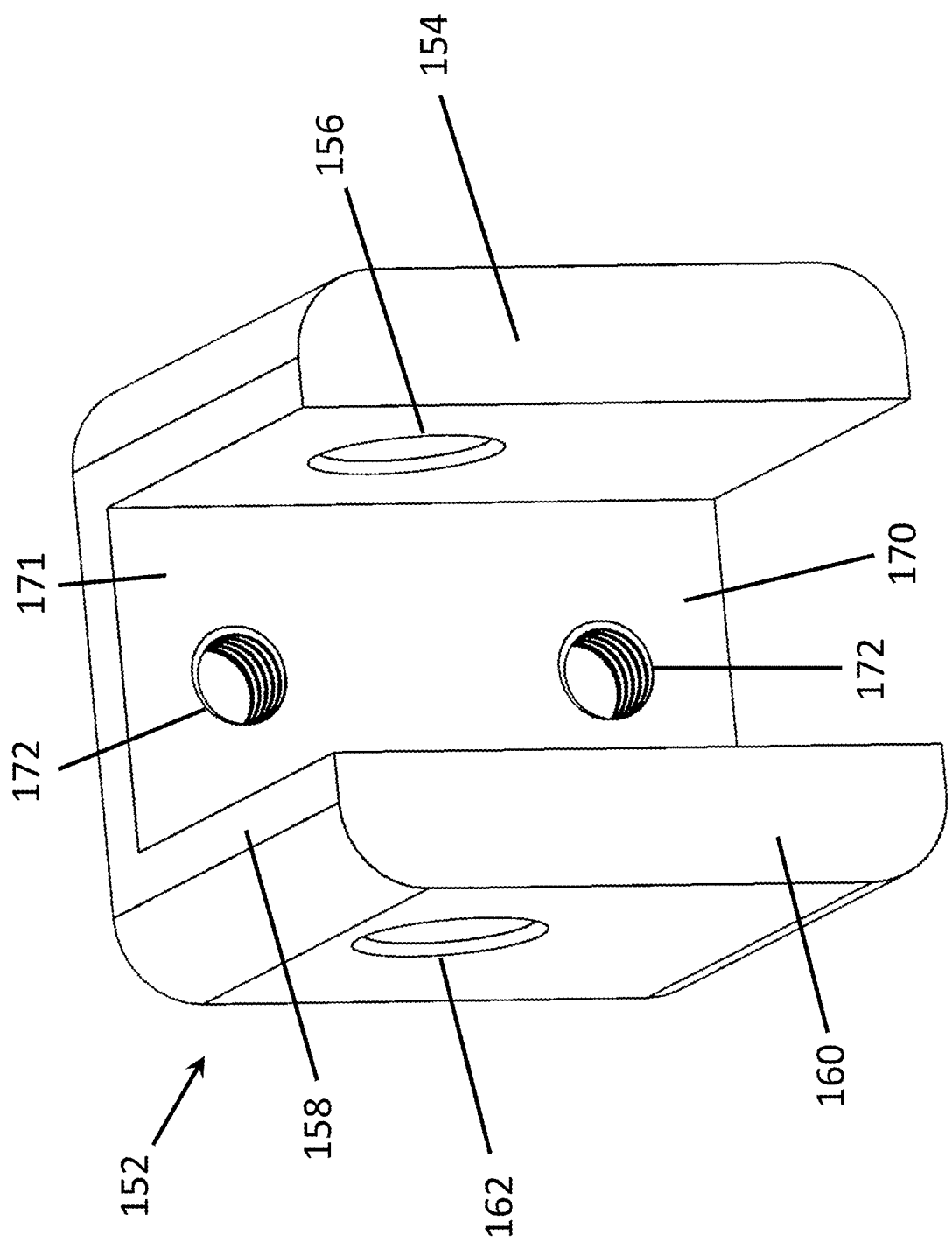
FIG. 11 is a perspective view from the front and above of an implementation of a clevis assembly according to aspects of the disclosed subject matter.
Figure 12:
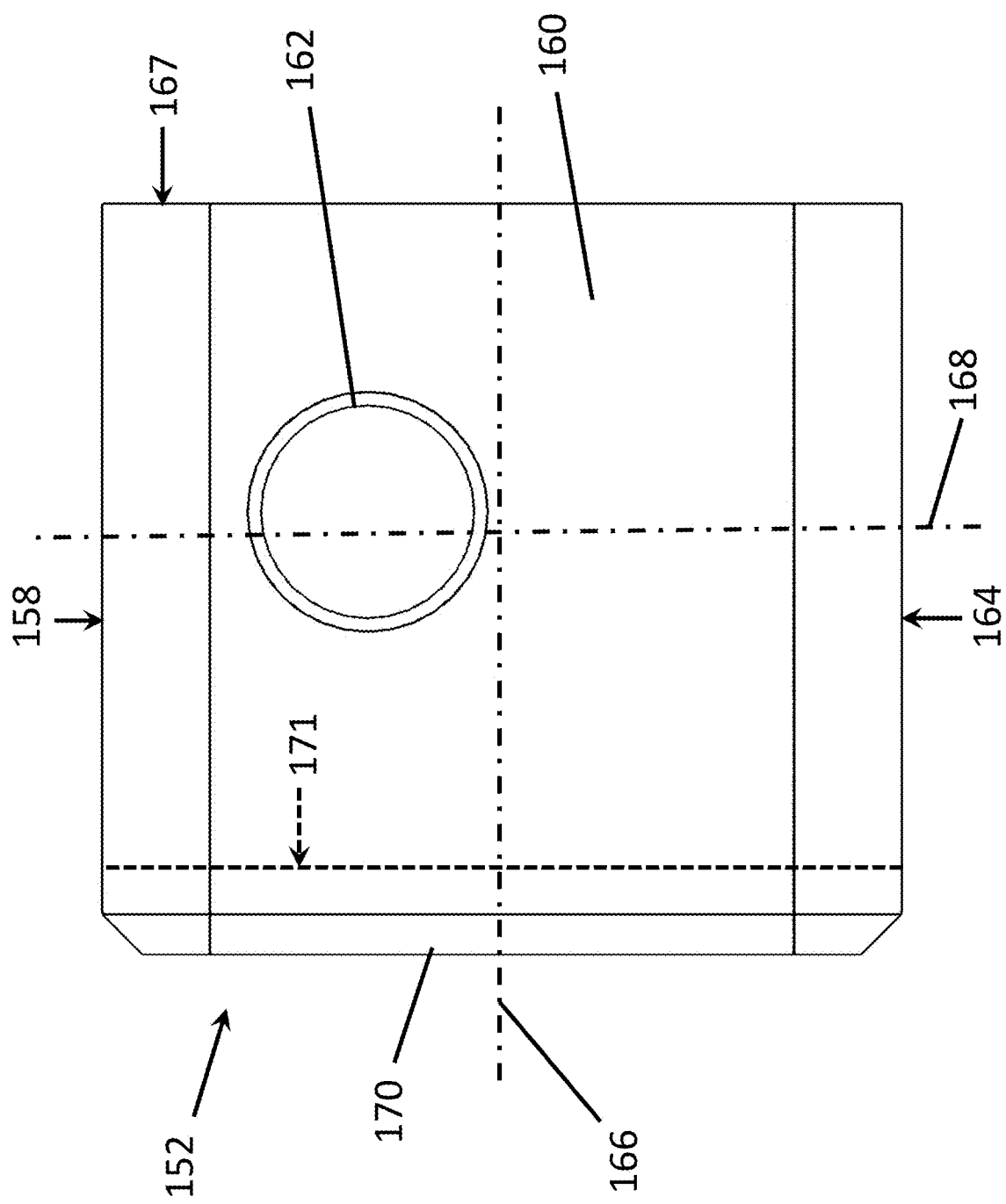
FIG. 12 is a left side elevation view of the clevis assembly of FIGS. 10-11.
Figure 13:
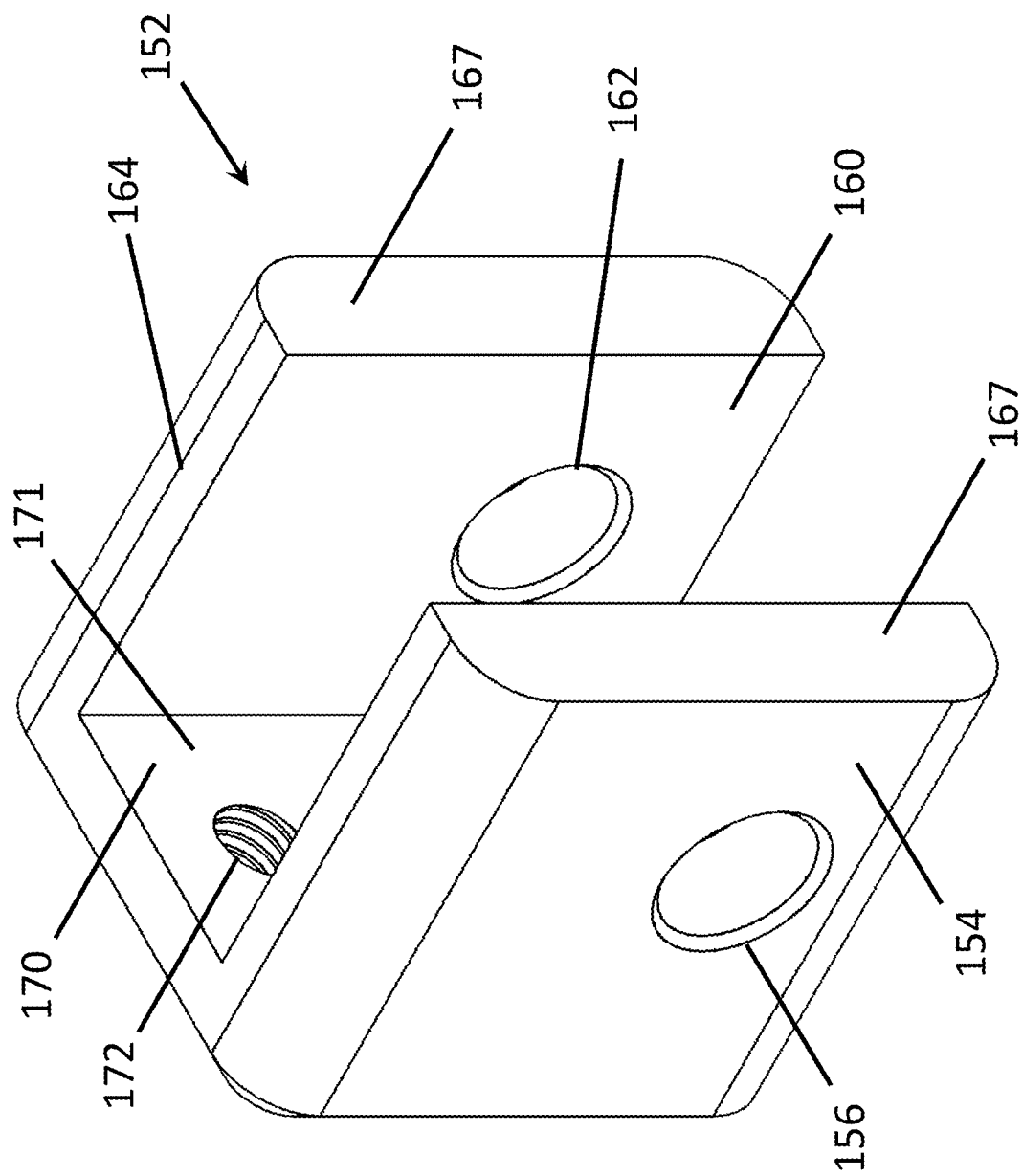
FIG. 13 is a perspective view from the front and above of an alternative implementation of a clevis assembly according to aspects of the disclosed subject matter.
Figure 14:
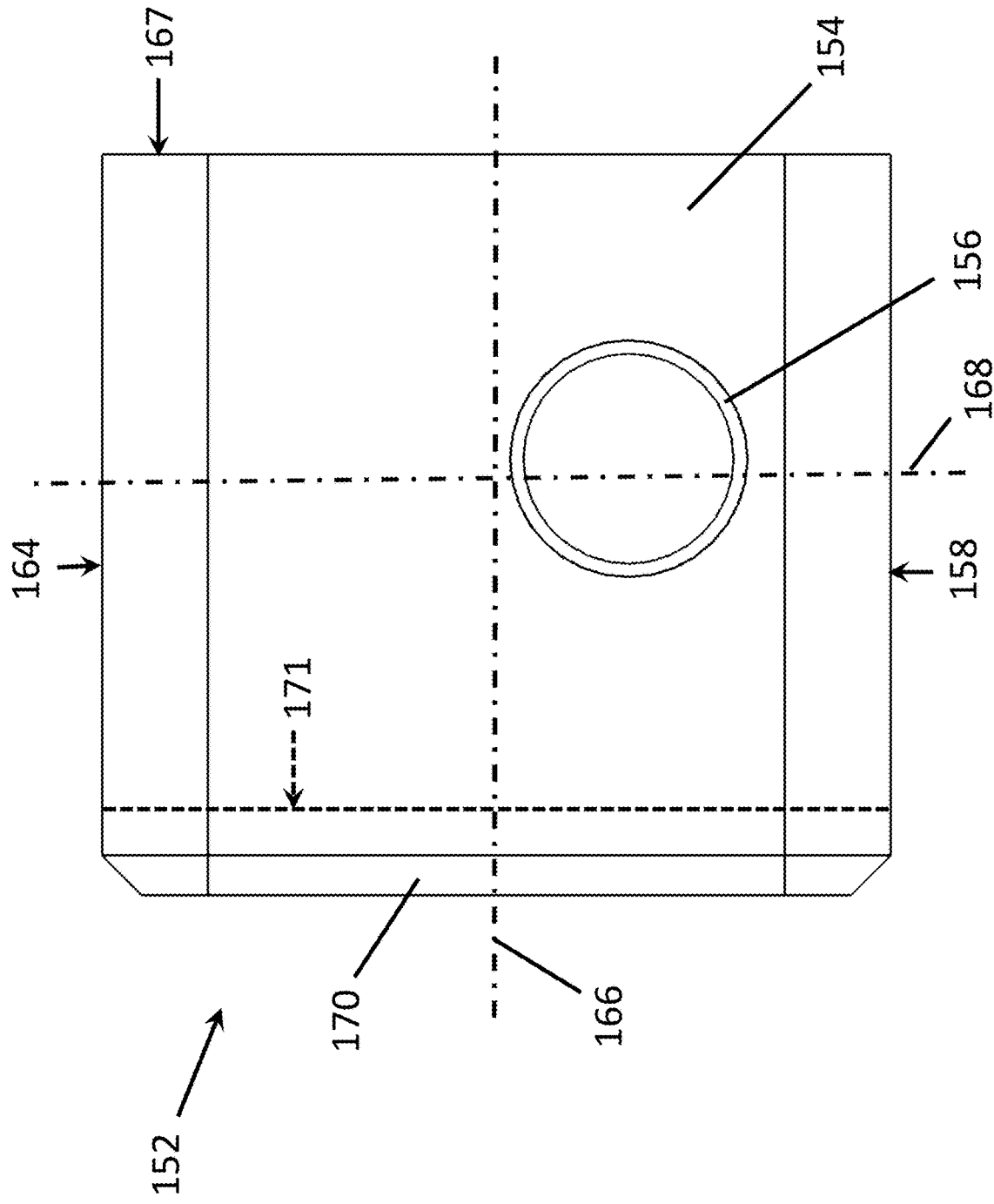
FIG. 14 is a left side elevation view of the clevis assembly of FIG. 13.
Figure 15:
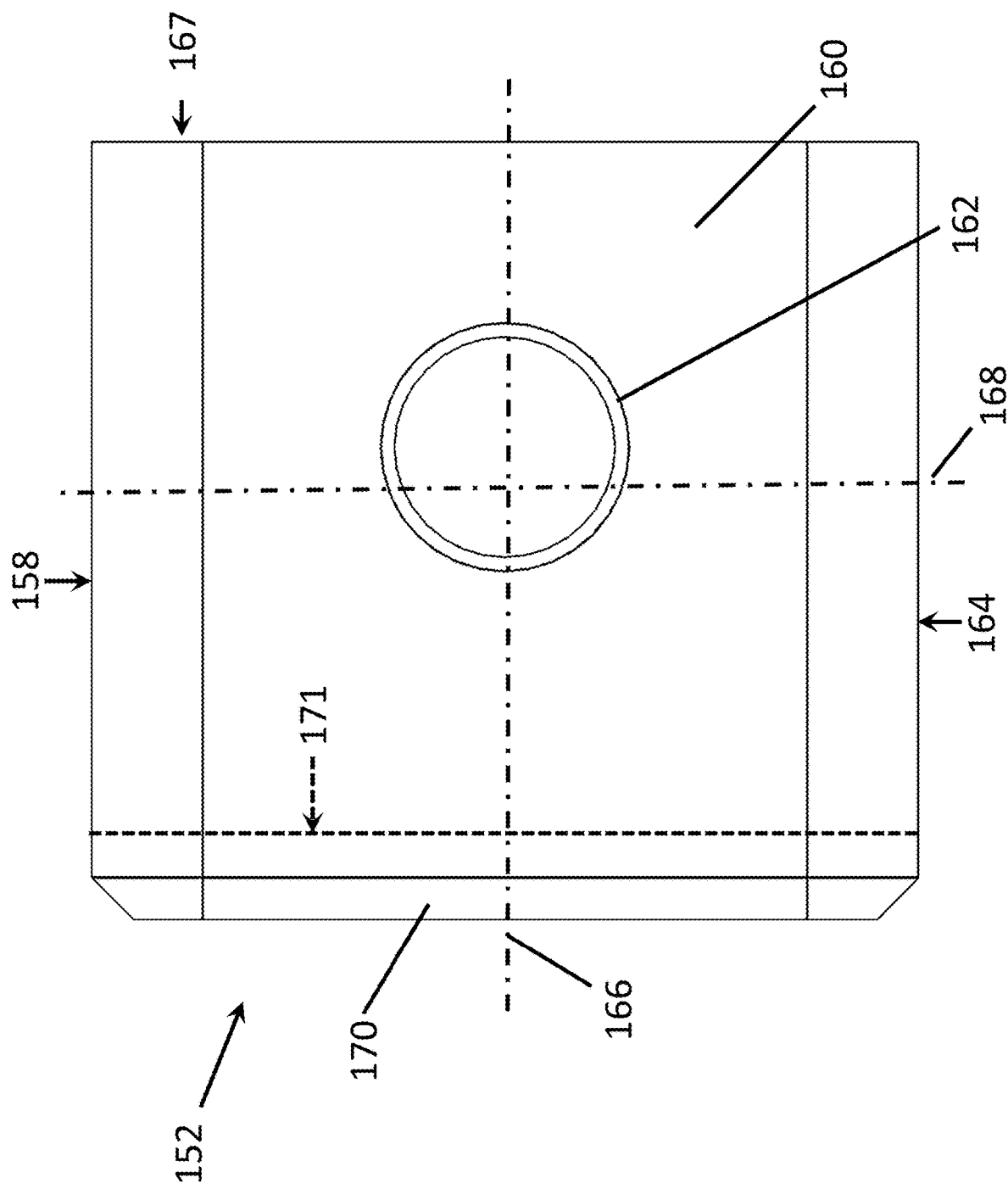
FIG. 15 is a right side elevation view of an implementation of a clevis assembly according to aspects of the disclosed subject matter.

Referring to FIGS. 11-15, an implementation of the clevis assembly 152 is shown whereby the assembly can be installed on the pedal arm 178 in two different orientations providing two different pedal ratios. Referring to FIGS. 11-12 where the first edge 158 is positioned above the second edge 164, the aperture 156 is formed in the first arm 154 and the opposing second aperture 162 is formed in the second arm 160, with the apertures 156, 162 disposed between the midline 166 and the first edge 158. Referring to FIGS. 13-14 the clevis assembly 152 is rotated 180 degrees whereby the first edge 158 is positioned below the second edge 164 providing a different pedal ratio from the clevis assembly 152 orientation of FIGS. 11-12. This different pedal ratio could also be formed by locating the apertures 156, 162 between the midline and the second edge 164 as the clevis assembly 152 is shown in FIG. 12. Manufacturing the clevis assembly 152 by positioning the apertures 156, 162 toward or away from the front face 171, and toward and away from the first edge 158 changes the pedal ratio. A user can quickly change the clevis assembly 152 used in the pedal assembly 100 with a clevis assembly 152 providing a different pedal ratio, as desired. By way of example, various placement of the apertures 156, 162 can provide pedal ratios of 6.43:1 (FIGS. 11-12), 8.19:1 (FIGS. 13-14), and 7.2:1 (FIG. 15).

Figure 16:
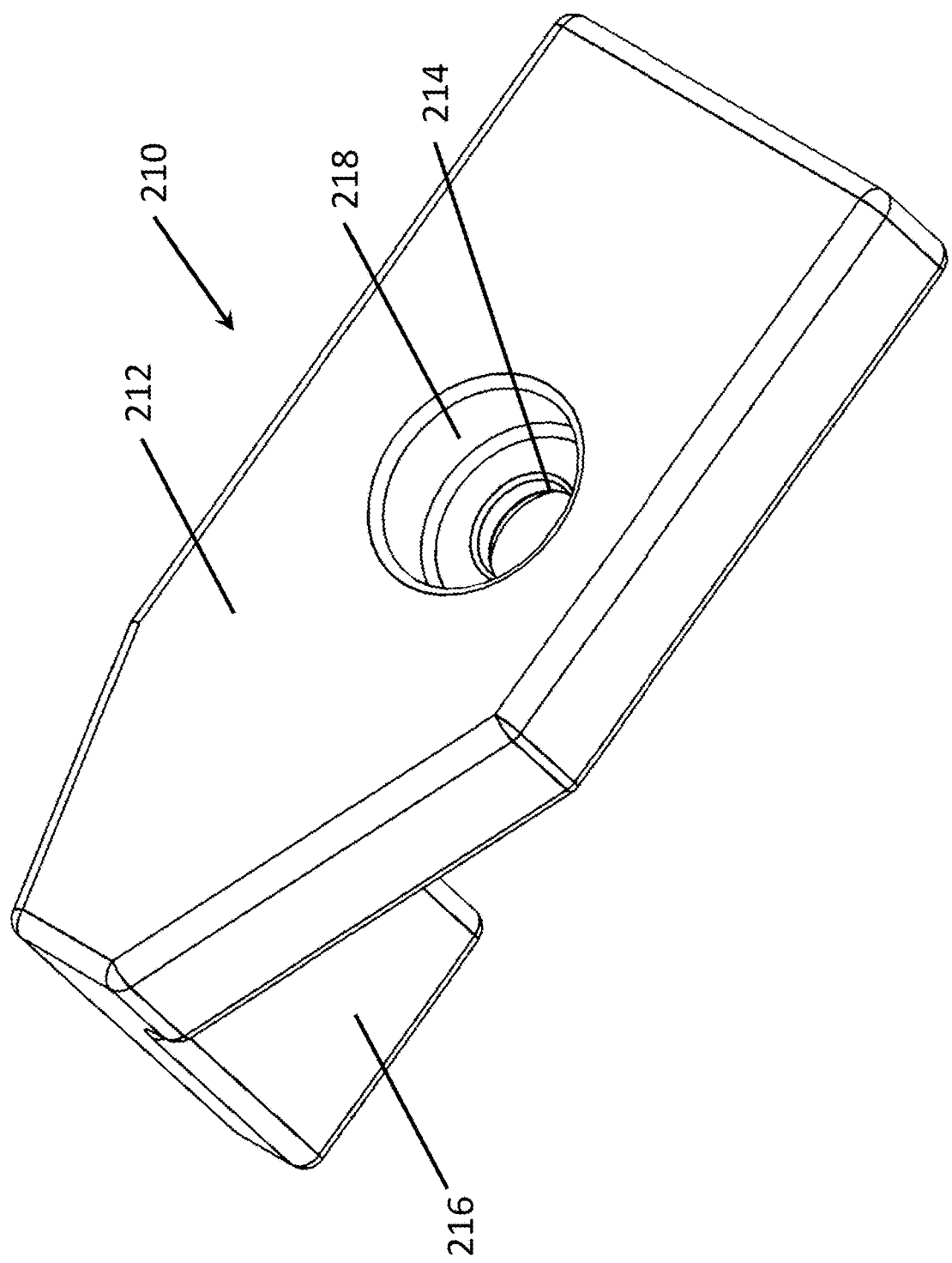
FIG. 16 is a perspective view from the right and above of a side plate according to aspects of the disclosed subject matter.

Referring to FIG. 16, a side plate 210 secured to the first side member 182 provides a tab 216 for contacting the automobile braking system brake light switch. The tab 216 extends from a side wall 212 of the side plate 210. The side wall 212 forms a boss seat 218 that communicates with an aperture 214. The pedal arm 178 first side member 182 forms a threaded boss 202 for attaching the side plate 210 to the first side member 182. The side plate 210 is connected to the pedal arm 178 by locating the threaded boss 202 within the boss seat 218 and passing a threaded shoulder bolt 204 through the aperture 214 and securing it to the threaded boss 202. The pedal arm 178 forms a tab 206 that contacts the side plate 210 when the tab 216 contacts the brake light switch to prevent rotation of the side plate about the boss 202. The shoulder bolt 204 can accommodate a return spring to move the brake pedal assembly 100 from the depressed position to the staring position.

The lower end or second end 196 of the pedal assembly 100 forms apertures for the mounting of a foot plate 222 distal from the pivot shaft 144 with fasteners 228, such as a nut and bolt combination. Opposing brackets 224 with apertures 226 on rear of the foot plate 222 provides for attachment of the foot plate 222 with the fasteners 228.

Having described the disclosed subject matter, what is claimed as new and desired to be secured by Letters Patent is:

1. A pedal assembly, comprising:
    a mounting base, comprising:
        an upper cavity formed by adjacent first and second side walls;
    a pedal arm extending between a first end and a second end, wherein the first end is pivotally connected to the mounting base, and wherein the first end includes a cavity; and
    a clevis assembly secured within the cavity, the clevis assembly comprising:
        a rear wall;
        a first arm extending from the rear wall; and
        a second arm extending from the rear wall, wherein the second arm is adjacent the first arm.

2. The pedal assembly of claim 1, further comprising:
    a first aperture passing through the first side wall; and
    an opposing second aperture passing through the second side wall.

3. The pedal assembly of claim 1, further comprising:
    wherein the rear wall forms a front face;
    wherein the first arm extends forward to a front edge, upward to an upper edge, and downward to a lower edge;
    a horizontal midline disposed equidistant between the first arm upper edge and the lower edge;
    a vertical midline disposed equidistant between the front face and the first arm front edge; and
    a first aperture formed by the first arm.

4. The pedal assembly of claim 3, wherein the first aperture is disposed between the horizontal midline and the upper edge.

5. The pedal assembly of claim 1, further comprising:
a threaded boss formed by the pedal arm;
a first tab formed by the pedal arm;
a shoulder bolt;
a side plate, comprising:
   a side wall forming a boss seat; and
   a tab extending from the side wall;
wherein the boss seat is adapted to receive the threaded boss; and
wherein the shoulder bolt is threadably connected to the threaded boss to secure the side plate to the pedal arm.

6. The pedal assembly of claim 1, wherein:
the cavity forms a rear wall; and
wherein the clevis assembly is secured to the cavity rear wall.

7. The pedal assembly of claim 1, further comprising:
a heim joint operably connected to the clevis assembly first arm and second arm;
a brake system master cylinder; and
wherein the heim joint is operably connected to the brake system master cylinder.

8. The pedal assembly of claim 1, further comprising:
wherein the rear wall forms a front face;
wherein the first arm extends forward to a front edge, upward to an upper edge, and downward to a lower edge;
a horizontal midline disposed equidistant between the first arm upper edge and the lower edge;
a vertical midline disposed equidistant between the front face and the first arm front edge;
a first aperture formed in the first arm; and
a second aperture formed in the second arm.

9. The pedal assembly of claim 8, wherein the location of the first aperture and the second aperture provides a pedal ratio of 6.43 to 1.

10. The pedal assembly of claim 8, wherein the location of the first aperture and the second aperture provides a pedal ratio of 8.19 to 1.

11. The pedal assembly of claim 8, wherein the location of the first aperture and the second aperture provides a pedal ratio of 7.2 to 1.

12. A pedal assembly, comprising:
a mounting base, comprising:
   an upper cavity formed by adjacent first and second side walls;
a foot extending rearward from the upper cavity, an elongated aperture formed by the foot;
a pedal arm pivotally connected to the mounting base by a pivot shaft;
a clevis assembly connected to the pedal arm, the clevis assembly comprising:
   a rear wall;
   a first arm extending from the rear wall; and
   a second arm extending from the rear wall, wherein the second arm is adjacent the first arm;
a threaded boss formed by the pedal arm;
a first tab formed by the pedal arm;
a shoulder bolt
a side plate, comprising:
   a side wall forming a boss seat and
   a tab extending from the side wall;
wherein the boss seat is adapted to receive the threaded boss; and
wherein the shoulder bolt is threadably connected to the threaded boss to secure the side plate to the pedal arm.

13. The pedal assembly of claim 12, further comprising a lip formed by the foot.

14. The pedal assembly of claim 12, further comprising:
a first aperture passing through the first arm; and
an opposing second aperture passing through the second arm.

15. The pedal assembly of claim 14, wherein the location of the apertures in the arms of the clevis assembly provide a pedal ratio of 6.43 to 1.

16. The pedal assembly of claim 14, wherein the location of the apertures in the arms of the clevis assembly provide a pedal ratio of 8.19 to 1.

17. The pedal assembly of claim 14, wherein the location of the apertures in the arms of the clevis assembly provide a pedal ratio of 7.2 to 1.

18. The pedal assembly of claim 12, wherein the upper cavity is open upward and forward.

19. The pedal assembly of claim 12, further comprising:
wherein the rear wall forms a front face;
wherein the first arm extends forward to a front edge, upward to an upper edge, and downward to a lower edge;
a horizontal midline disposed equidistant between the first arm upper edge and the lower edge;
a vertical midline disposed equidistant between the front face and the first arm front edge; and
a first aperture formed by the first arm.

20. The pedal assembly of claim 19, wherein the first aperture is disposed between the horizontal midline and the upper edge.

21. The pedal assembly of claim 12, further comprising:
a heim joint operably connected to the clevis assembly first arm and second arm;
a brake system master cylinder; and
wherein the heim joint is operably connected to the brake system master cylinder.

22. A pedal assembly, comprising:
a mounting base, comprising:
   an upper cavity formed by adjacent first and second side walls;
a pedal arm extending between a first end and a second end, wherein the first end forms a pivot connection with the mounting base;
a cavity adjacent the pivot connection;
a clevis assembly secured within the cavity, the clevis assembly comprising:
   a rear wall forming a front face;
   a first arm extending from the rear wall, wherein the first arm extends forward to a front edge, upward to an upper edge, and downward to a lower edge;
   a horizontal midline disposed equidistant between the first arm upper edge and the lower edge;
   a first aperture passing through the first arm disposed between the horizontal midline and the upper edge;
   a second arm extending from the rear wall, wherein the second arm extends forward to a front edge, upward to an upper edge, and downward to a lower edge;
   a second aperture passing through the second arm disposed between the horizontal midline and the upper edge, wherein the second aperture opposes the first aperture;
wherein the second arm is adjacent the first arm; and
a foot plate secured to the pedal arm second end.

23. The pedal assembly of claim 22, further comprising:
 a heim joint operably connected to the clevis assembly first arm and second arm;
 a brake system master cylinder; and
 wherein the heim joint is operably connected to the brake system master cylinder.

24. The pedal assembly of claim 22, wherein the location of the apertures in the arms of the clevis assembly provide a pedal ratio of 6.43 to 1.

25. The pedal assembly of claim 22, wherein the location of the apertures in the arms of the clevis assembly provide a pedal ratio of 8.19 to 1.

26. The pedal assembly of claim 22, wherein the location of the apertures in the arms of the clevis assembly provide a pedal ratio of 7.2 to 1.

* * * * *